(12) United States Patent
Garthwaite

(10) Patent No.: US 8,801,478 B2
(45) Date of Patent: Aug. 12, 2014

(54) WATERCRAFT

(75) Inventor: Martin Spencer Garthwaite, Bainbridge Island, WA (US)

(73) Assignee: Fishboat, Inc.

( * ) Notice: Subject to any disclaimer, the term of this patent is extended or adjusted under 35 U.S.C. 154(b) by 95 days.

(21) Appl. No.: 13/501,032

(22) PCT Filed: Oct. 8, 2010

(86) PCT No.: PCT/US2010/051923
§ 371 (c)(1),
(2), (4) Date: Apr. 9, 2012

(87) PCT Pub. No.: WO2011/044424
PCT Pub. Date: Apr. 14, 2011

(65) Prior Publication Data
US 2012/0199058 A1 Aug. 9, 2012

Related U.S. Application Data

(60) Provisional application No. 61/249,963, filed on Oct. 8, 2009.

(51) Int. Cl.
*B63H 16/00* (2006.01)
(52) U.S. Cl.
USPC .............................. 440/21; 440/14; 114/360
(58) Field of Classification Search
USPC .................. 440/14, 21, 22, 32; 114/343, 360
See application file for complete search history.

(56) References Cited

U.S. PATENT DOCUMENTS

| | | | | |
|---|---|---|---|---|
| 4,968,273 A | * | 11/1990 | Momot | 440/14 |
| 6,099,369 A | * | 8/2000 | Puzey | 440/21 |
| 6,595,813 B1 | | 7/2003 | Lekhtman | |
| 6,964,589 B1 | | 11/2005 | Lin | |
| 6,997,765 B1 | | 2/2006 | McGuinness | |
| 7,021,232 B2 | * | 4/2006 | Chen | 440/21 |
| 7,112,108 B2 | | 9/2006 | McMullen | |
| 7,802,534 B2 | * | 9/2010 | Chen | 440/21 |
| 7,819,074 B2 | * | 10/2010 | Chen | 440/21 |
| 2002/0124783 A1 | | 9/2002 | Dynes | |
| 2004/0045491 A1 | | 3/2004 | Mele | |

OTHER PUBLICATIONS

Parker Maccready, The Pogo Foil, A Human Powered Boat with Flapping Wing Propulsion, 1992, Seattle, WA, USA, accompanying this paper.

* cited by examiner

*Primary Examiner* — Lars A Olson

(57) ABSTRACT

The disclosed invention is directed to a watercraft which comprises at least one main force member attached to at least one wing; the main force member and/or wing and/or a float attached to the wing comprise sufficient displacement to provide flotation for the craft and its payload. Connected to the main force member is a force transmitting member, to which the engine is connected. The engine may comprise a person or another engine (conventional, electronic, wind, etc.). The engine may comprise a weight which undergoes vertical translation, thereby producing the force transmitted by the force transmitting member to the main force member.

22 Claims, 13 Drawing Sheets

Figure 1
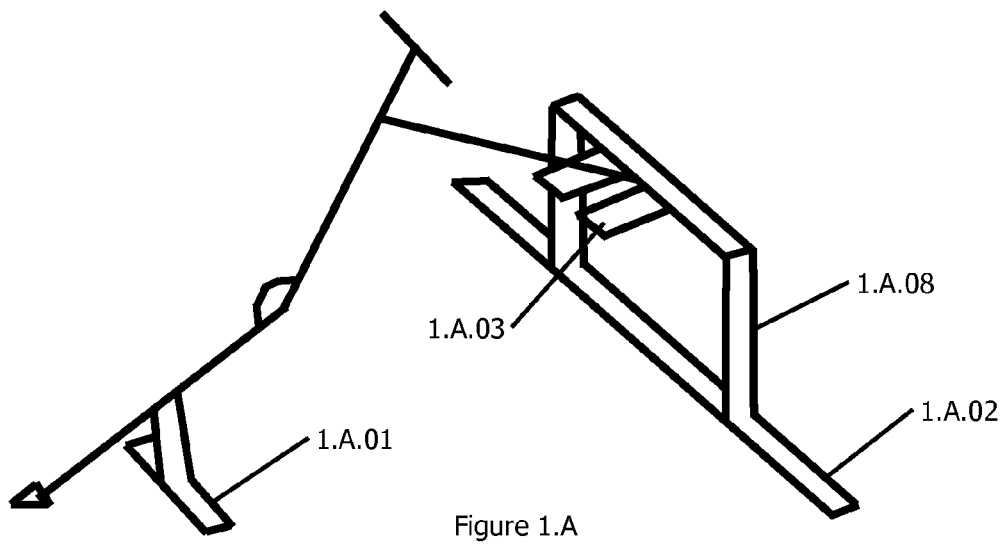
Figure 1.A
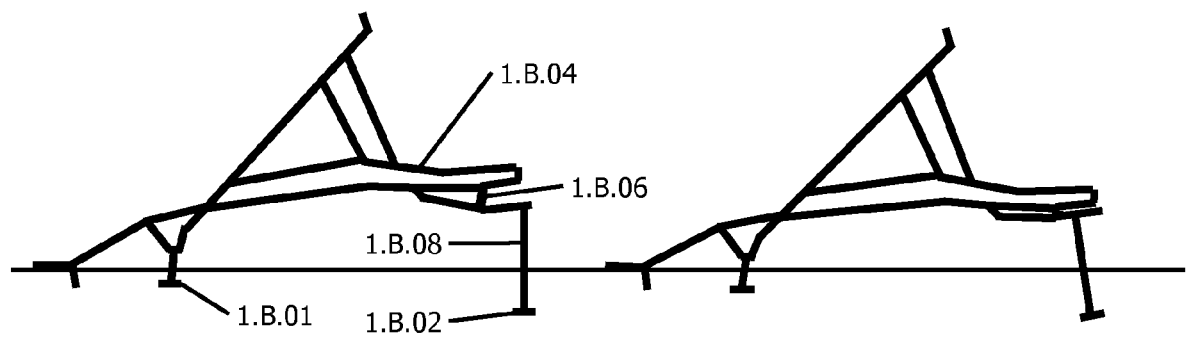
Figure 1.B
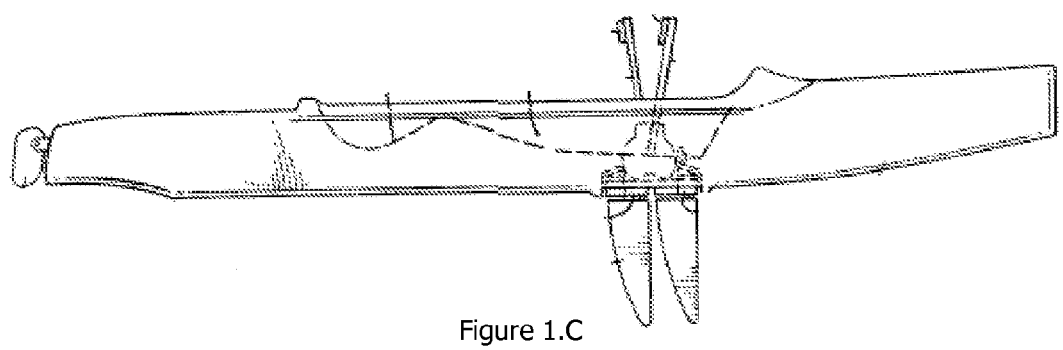
Figure 1.C

Figure 7
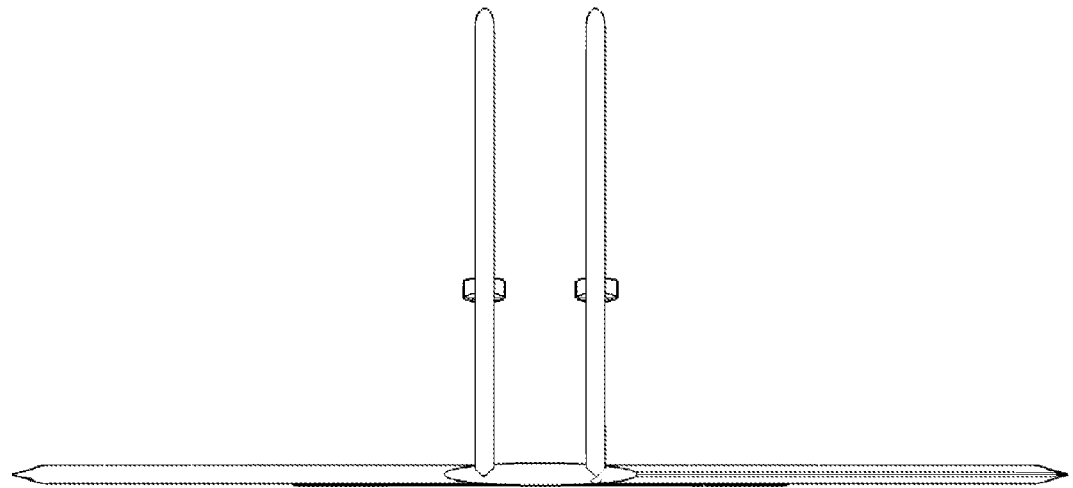
Figure 7.A
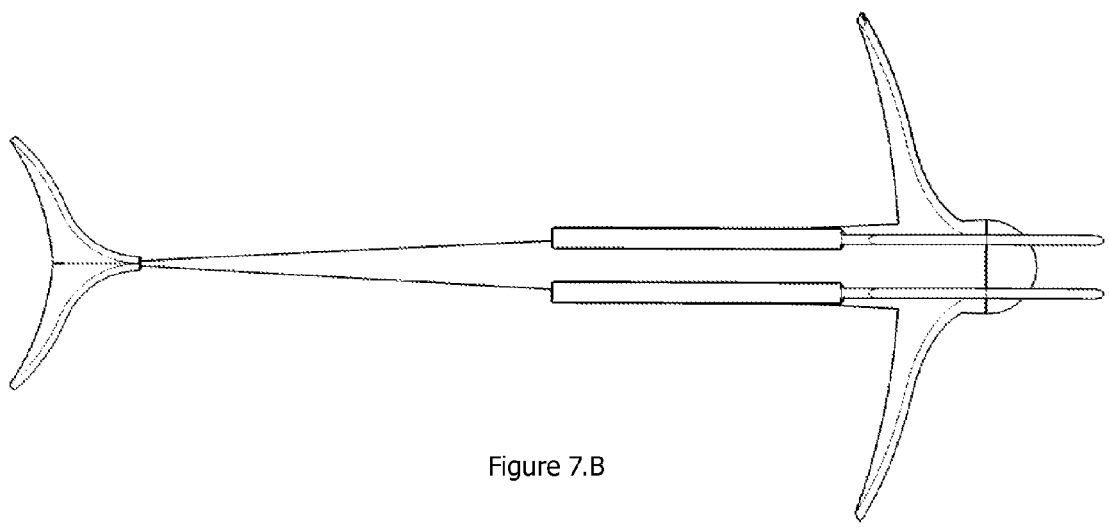
Figure 7.B
Figure 7.C

Figure 13.A
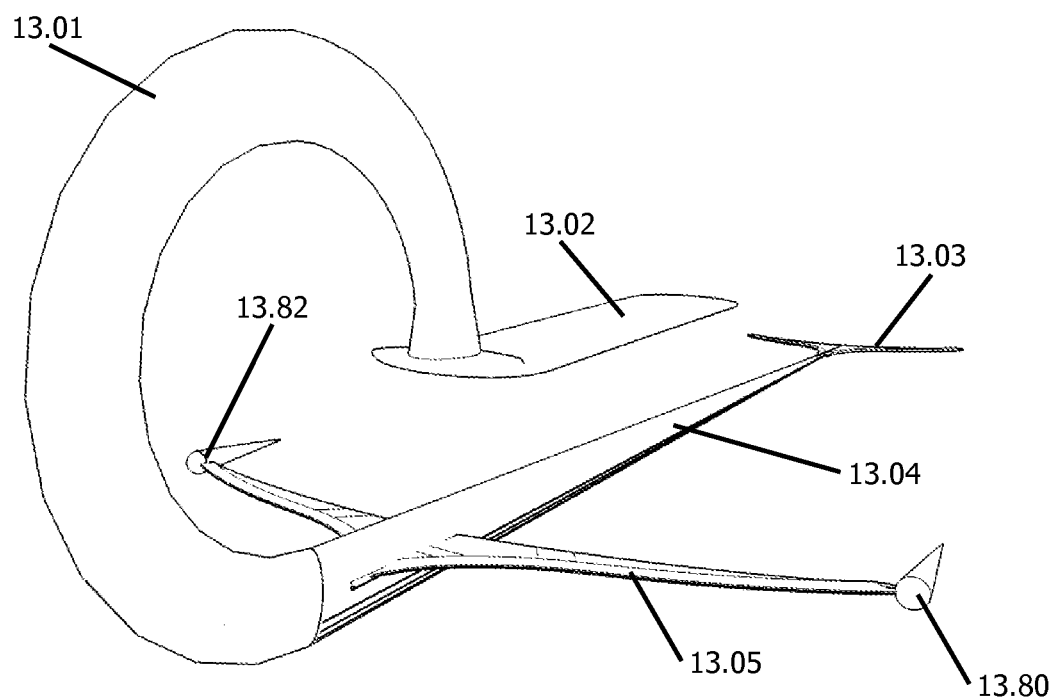
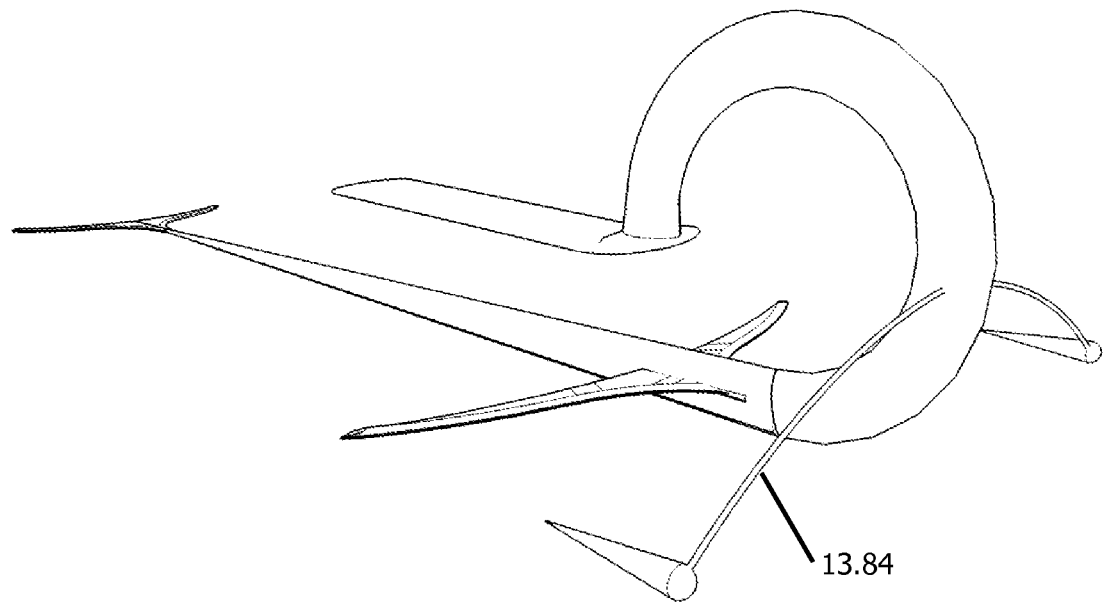
Figure 13.B

WATERCRAFT

This application claims the benefit of U.S. provisional application No. 61/249,962, filed Oct. 8, 2009, and incorporates all of such application by this reference; this application is a national stage entry of PCT application number PCT/US10/51923, filed Oct. 8, 2010.

BACKGROUND

Watercraft have remained largely unchanged for thousands of years, generally utilizing a displacement member with a fixed volume and rigid exterior and generally obtaining propulsion from sails, oars, or, more recently, paddle wheels, propellers, impellers, or air fans. Recent developments include the "trampfoil" and a flipper-craft, by Hobbiecraft, Inc., which is the subject of U.S. Pat. No. 6,022,249. A schematic drawing of the trampfoil, prepared from publicly available color drawings, is provided in FIG. 1.A. The trampfoil utilizes two underwater wings or hydrofoils 1.A.01 and 1.A.02 to generate forward thrust and lift, force being provided by the vertical translation of the user who stands on the platform 1.A.03. While fast for a human powered craft (it planes and can travel at around 20 mph), if the craft stops, it sinks. Neither the wings nor the platform 1.A.03 provide sufficient displacement to support the weight of the user.

Two schematic drawings of the PumpaBike, prepared from publicly available color drawings, are provided in FIG. 1.B. The PumpaBike, a version of the trampfoil, has been developed which includes a displacement body 1.B.04 to displace water and provide floatation for the user when the user is not providing power. The displacement body is lifted from the water when the PumpaBike is in motion and exceeds a minimum speed (as shown in FIG. 1.B). The PumpaBike includes a spring between the displacement body and the supports 1.B.08 for the hydrofoils 1.B.01 and 1.B.02, which spring is probably compressed by some portion of the downward cycle in the user's vertical translation and which spring probably releases its stored energy around the beginning of the upward cycle of the user's vertical translation. The uncompressed spring is represented in FIG. 1.B by element 1.B.06. The PumpaBike is otherwise similar to the trampfoil. The Pumpabike can float, but, like the trampfoil, it cannot be started from the water. In addition, and as with the trampfoil, the operator must expend a significant amount of energy to maintain a planing state.

A drawing of the Hobbiecraft flipper-craft from U.S. Pat. No. 6,022,249 is provided in FIG. 1.C. The wings on the Hobbiecraft flipper-craft are attached to a more-or-less conventional boat body, which boat body provides flotation for the craft's payload. The wings on the Hobbiecraft flipper-craft are designed to produce thrust, not lift for the craft.

Required is a watercraft which provides sufficient flotation to support its payload, which provides an efficient mechanism for generating thrust and potentially lift, which does not require planing, and which utilizes a minimum of moving parts. Unlike many of the examples from the prior art discussed above, the presently disclosed craft is not designed to plane.

SUMMARY

This summary is provided to introduce a selection of concepts in a simplified form that are further described below in the detailed description. This summary is not intended to identify key or essential features of the claimed subject matter, nor is it intended to be used to limit the scope of the claimed subject matter.

Generally stated, the disclosed invention is directed to a watercraft which comprises at least one main force member attached to at least one wing; the main force member and/or wing and/or a float attached to the wing comprise sufficient displacement to provide flotation for the craft and its payload. Connected to the main force member is a force transmitting member, to which the engine is connected. The engine may comprise a person or another engine (conventional, electronic, wind, etc.). The engine may comprise a weight which undergoes vertical translation, thereby producing the force transmitted by the force transmitting member to the main force member.

BRIEF DESCRIPTION OF THE DRAWINGS

FIGS. 1.A, 1.B, and 1.C depict examples from the prior art.

FIG. 7.A depicts a front elevation view of a version of the disclosure.

FIG. 7.B depicts a top plan view of a version of the disclosure.

FIG. 7.C depicts a side elevation view of a version of the disclosure.

FIG. 13.A depicts an orthogonal view of a version of the disclosure with a narrower main force member and floats on the ends of the forward wing.

FIG. 13.B depicts an orthogonal view of a version of the disclosure with a narrower main force member and floats on separate arms.

DETAILED DESCRIPTION

The following detailed description refers to the accompanying drawings. The reference numbers generally begin with a numeral which identifies the figure, followed by another numeral which identifies the feature. The same feature number in different drawings generally identify the same or similar elements and/or components. The following detailed description is for the purpose of illustrating embodiments of the invention only, and other embodiments are possible without deviating from the spirit and scope of the invention, which is limited only by the appended claims. Certain of the figures are discussed in this specification using certain terms. The following discussion uses these terms and related terms as examples and not as limitations. The components depicted in certain of the figures represent functional groups; it should be understood that such functional groupings need not exist as discrete hardware devices and that the functions described as occurring within, comprising, or being provided by a grouping may be provided within or by common or separate physical devices. The functions within and comprising any of the function groupings may be regrouped in other combinations and certain of the components may be omitted without deviating from the spirit of the disclosed invention. Certain of the groupings depict components which are included together in the illustration for the sake of convenience. Certain of the figures depict components in isolation; the components from different figures may be combined and/or regrouped.

Figure 2:
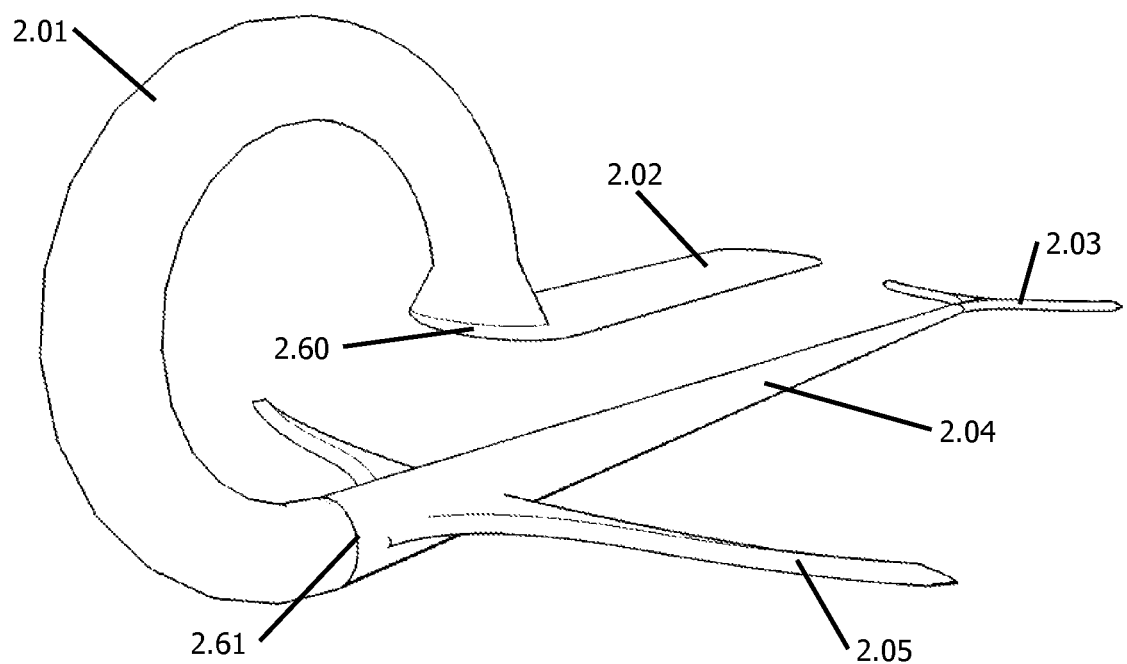
FIG. 2 depicts an orthogonal view of a version of the disclosure with one force transmitting member.
Figure 10:
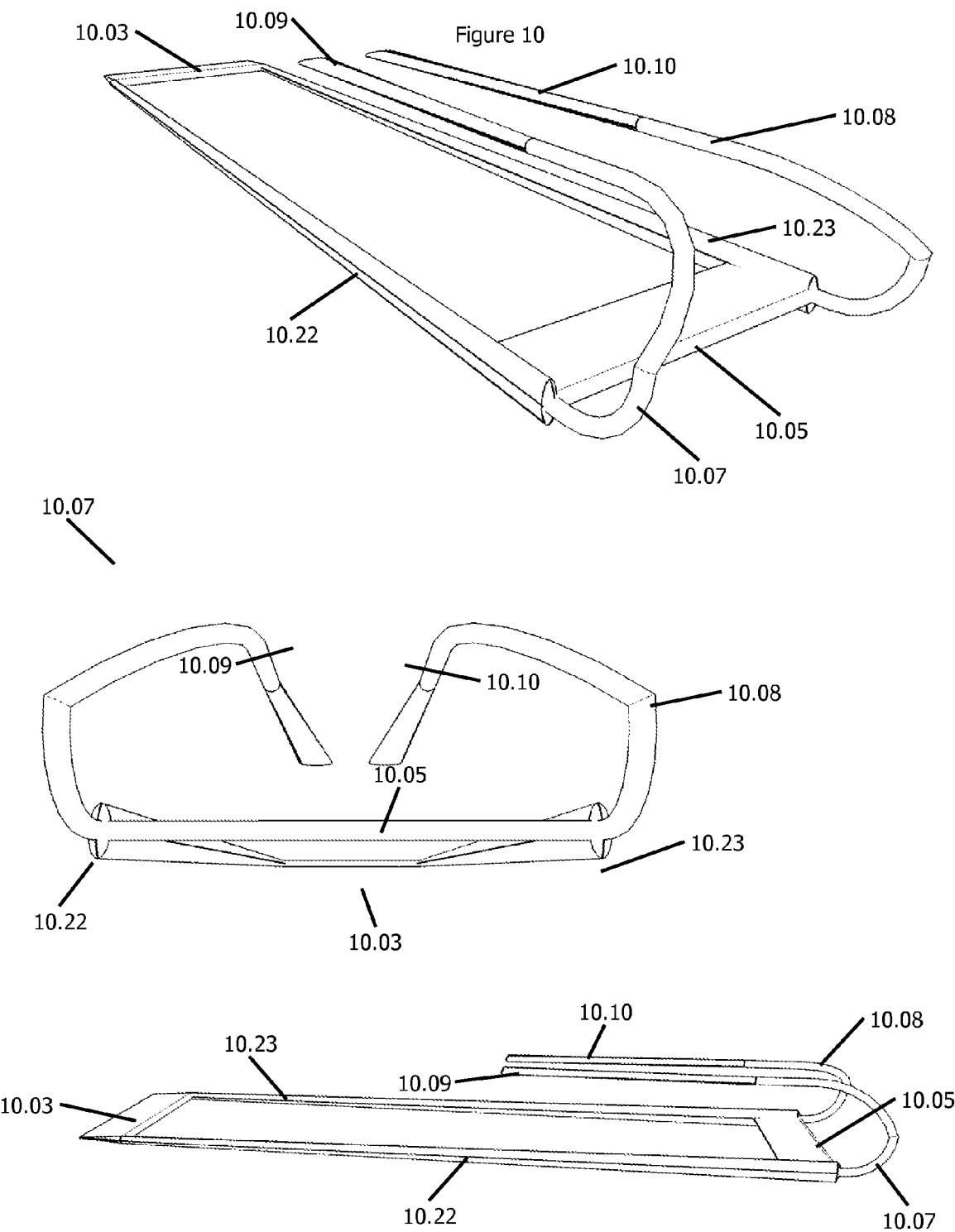
FIG. 10 depicts multiple orthogonal views of a version of the disclosure.
Figure 14:
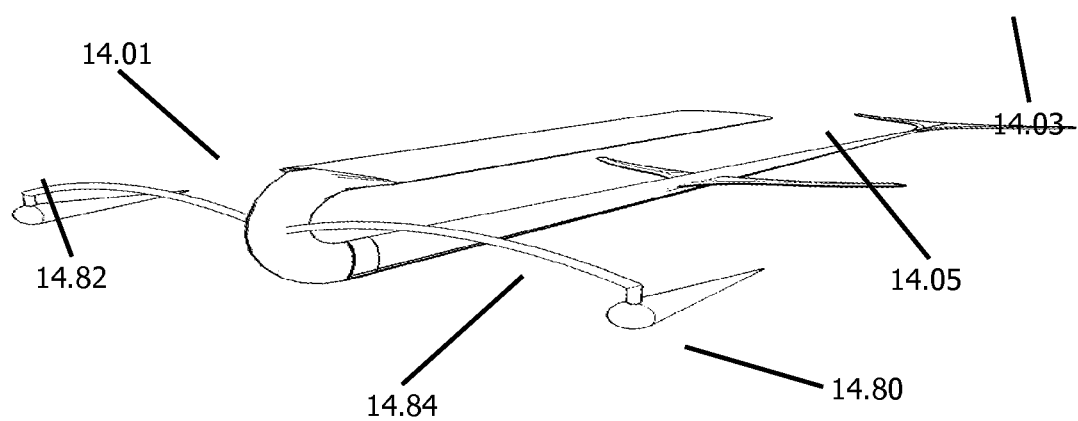
FIG. 14 depicts an orthogonal view of a version of the disclosure with floats on separate arms, a more compact forward arc, and with the forward wing moved backward.

FIG. 2 depicts an orthogonal view of a version of the disclosure. FIG. 2 comprises a force transmitting member comprising a platform 2.02 and an arc 2.01. The engine, for example a person, may be attached to (including standing upon) the platform 2.02. The engine attachment may be repositioned, such as by walking forward or backward or by repositioning hardware. The engine and/or engine attachment may comprise a gear and/or chain assembly (not shown) which may be rotated to subject a weight (which may include the engine) to vertical and/or horizontal translation. The attachment may be repositioned for various reasons, such as for harmonic reasons relative to oscillation of the main force member 2.04, to adjust the fore-aft balance of the craft in the water, to address waves in the water, to shift the engine forward, toward the front wing 2.05, or backward, toward the rear wing 2.03, or side-to-side, or for other reasons. The arc 2.01 is depicted as comprising a semi-circular feature, in this case approximately three-quarters of a circle, though it may also be provided by a feature which is straight, such as between locations 2.60 and 2.61, or between another set of locations, or which has another shape or a different attachment point to either or both of the platform 2.02 and/or the main force member 2.04. As shown in later figures, the arc 2.01 and/or platform 2.02 may comprise one or more members. For example, the arc may be a compound shape, as shown in FIG. 10, and/or a more compact arc, as shown in FIG. 14 (in which the arc is approximately one-half of a circle). The platform 2.02 may be omitted and/or may be combined with the arc 2.01. In a version (not shown in the drawings), the arc 2.01 may extend further toward the rear of the craft, such as to the approximate location of the centroid of the main force member, and the platform 2.02 may be provided (or replaced) by more compact mounting hardware for the engine.

The wings 2.05 and 2.03 may have a different shape and aspect ratio than that shown in FIG. 2 and the other figures. The wings 2.05 and 2.03 are not shown as having a distinct dividing line or separation between the wing and the force transmitting member 2.04; it should be understood that the wings may be distinct components and that they may have attachments to the main force member 2.04 and/or each other and/or other components (as discussed below) which have a different shape. One of the wings, such as the rear wing 2.03 or the forward wing 2.05, may be omitted. The forward wing 2.05 may be relocated along the main force member, such as by being moved toward the centroid of the main force member. The forward wing 2.05 may include an attachment to the main force member 2.04 to allow the forward wing 2.05 to be repositioned, including dynamically, when the craft is underway. The wings may include a mechanism to change the orientation of the wings, such as to move the wing end forward and back relative to the main force member The modulus of flexibility of the arc, platform, and/or main force member may be adjusted, including through the use of internal or external members or components. Adjustment of the modulus of flexibility may be semi-permanent, such as, for example, through the attachment of additional arcs or arc components, or dynamic, as may be achieved by changing the tension of one or more components, such as, for example, if the arc comprises one or more intertwined helices or an overlapping set of rods (or arc components) which may be tightened or loosened relative to one another to change the modulus of flexibility or to change the angle of the arc (which may effectively change the modulus of flexibility) or if the arc comprises one or more elastic or inelastic bands which may be tightened or loosened relative to one another and/or a force transmitting member. Adjustment of the modulus of flexibility may entail adjustment of the angle of attachment between the platform and the arc. The platform 2.02 may be another shape, may be shorter, long, or wider than as depicted, and/or may comprise engine mounting hardware.

The main force member 2.04 is depicted in figure two as having a round cross-section (when viewed from the front). Round or otherwise, the displacement of the force transmitting member and/or main force member, and/or the front and/or rear wing and/or the arc and/or an attachment to the wings or another component, such as a float (see FIGS. 13.A, 13.B, and 14 and the discussion below) may be varied, such as by contracting or expanding the member (forward and back, side to side, and/or top to bottom), through the use of internal compression straps or similar, by changing the amount of a fluid (including a gas) within the member or from a section within the member (for example, in a member comprising different sections, which different sections are under tension relative to each other), through the use of one or more rods, jack screws, or similar, which may be rotated, bent on a joint, screwed or otherwise relocated relative to one another to change the volume of an internal portion, thereby changing the overall volume and displacement of the member. The displacement may be varied to accommodate different weights of the craft and payload (including the craft, engine, and any other mass supported by the craft, herein referred to collectively as the "payload"), to reduce the frontal area of the craft in the water, to change the stability of the craft, to change the amount of lift and/or thrust produced by one or both sides of the craft or similar.

Figure three depicts an orthogonal view of a version of the disclosure. This view differs from figure two at least in that two platforms, 3.09 and 3.10, are connected to two arcs, 3.07 and 3.08. In this example, one platform is provided for each foot of a human engine. While a single platform may be used in a similar manner, providing two platforms may further allow the engine (e.g. human) further opportunities to change the amount of force transmitted to each side of the craft. If a non-human engine is used, similarly more than one arc and/or platform may be used. As an alternative to multiple platforms and/or arcs, for example, the engine attachment location may be varied from side to side and forward and back on a single arc and/or platform, and/or the engine may comprise a gyroscope or flywheel with a center of rotation which may be varied in more than one dimension. A one-dimensional variation in the center of rotation of a gyroscope or flywheel may be used to produce vertical translation of the motor and/or flywheel; the additional dimension(s) being used, for example, to produce horizontal translation of the motor and/or or weight coupled with the motor. Or the engine may be a single-piston mass-displacement, such as a diesel pile-driving hammer, which may similarly be varied in its orientation (in one-, two-, or n-dimensions).

Figure three also depicts a main force member 3.04 which is flatter or more oval than that depicted in figure two, as well as arcs 3.07 and 3.08, which are more oval than that depicted in figure two.

Figure 4:
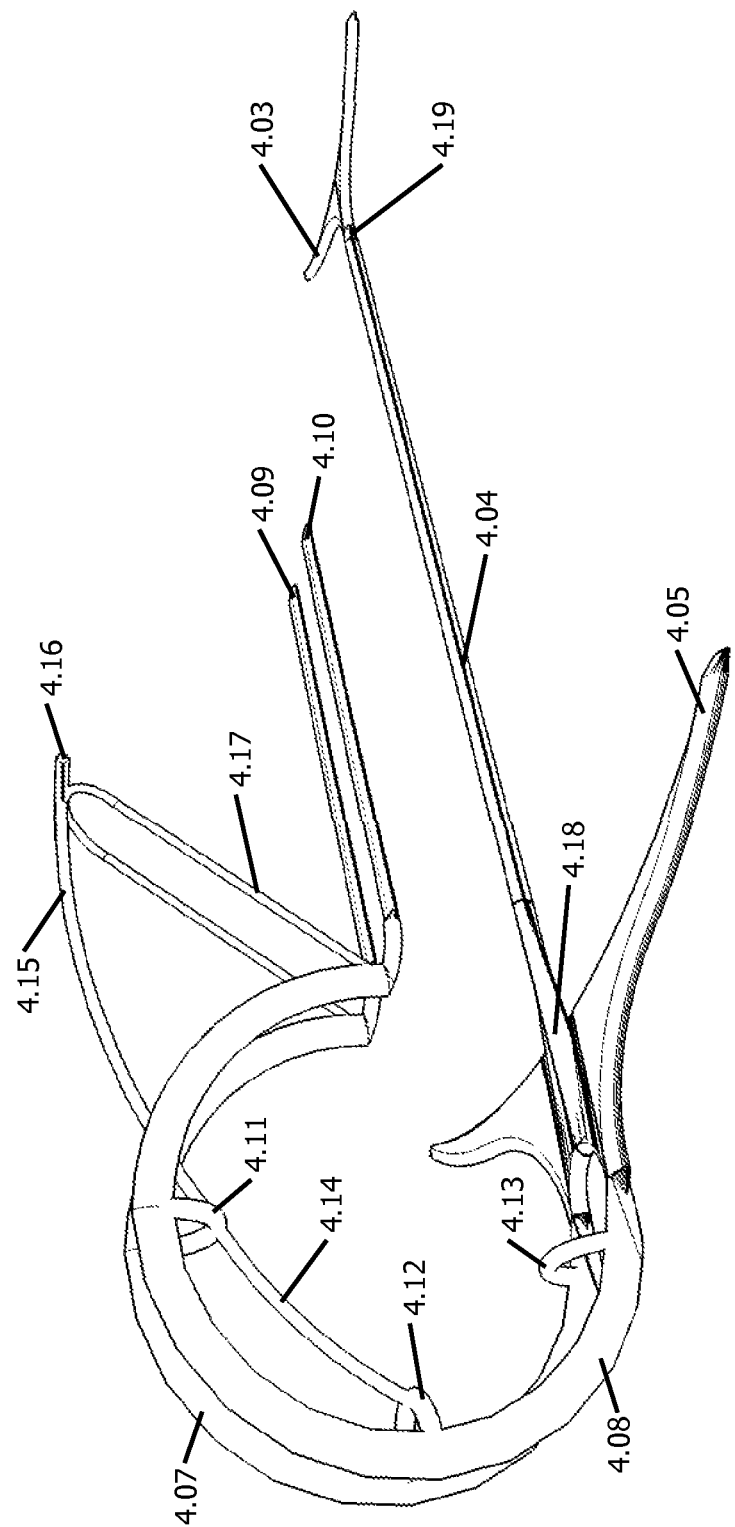
FIG. 4 depicts an orthogonal view of a version of the disclosure with a narrower main force member and a visible steering mechanism.

Figure four depicts a narrower main force member 4.04 with a vertically oriented oval cross-section (the long axis of the oval is up/down). Figure four depicts a wing connector 4.18 and arc connectors 4.11, 4.12, and 4.13. Figure four also depicts one or more steering rods 4.14, 4.15, and/or 4.17 connected to a steering handle 4.16. The steering handle and/or one or more hand levers 4.16 connected to the steering handle may be manipulated and/or otherwise comprise a mechanism to turn the craft. Turning the craft may be accomplished, for example, by changing the orientation of one or more of the wings or a portion of a wing, including moving the rear wings 4.03, which may be accomplished by pivoting the wing or wing portion on an axle, such as at 4.19, by arching the main thrust member 4.04 along a largely horizontal plane (such as, for example, by contracting a wire or other member on one side within the main thrust member 4.04, by changing the pressure of a fluid within the main thrust member 4.04, through use of several axles spaced along the main thrust member, or similar) and/or by changing the amount or orientation of thrust produced by one side of one or both wings 4.05 and 4.03. Changing the amount or orientation of thrust produced by one side of a wing may be accomplished by changing the angle of attack or allowed angle of attack of the wing, by changing the wing's attachment (or elasticity of attachment) to a relatively fixed central component, by use of a flap, or through other means which change the amount or orientation of thrust produced by a wing. In FIG. 4, the arcs 4.07 and 4.08 and main force member 4.04 may intersect on a common axis in the wing connector 4.18, which may be useful in allowing the front wings to pivot around the axis.

Figure 8:
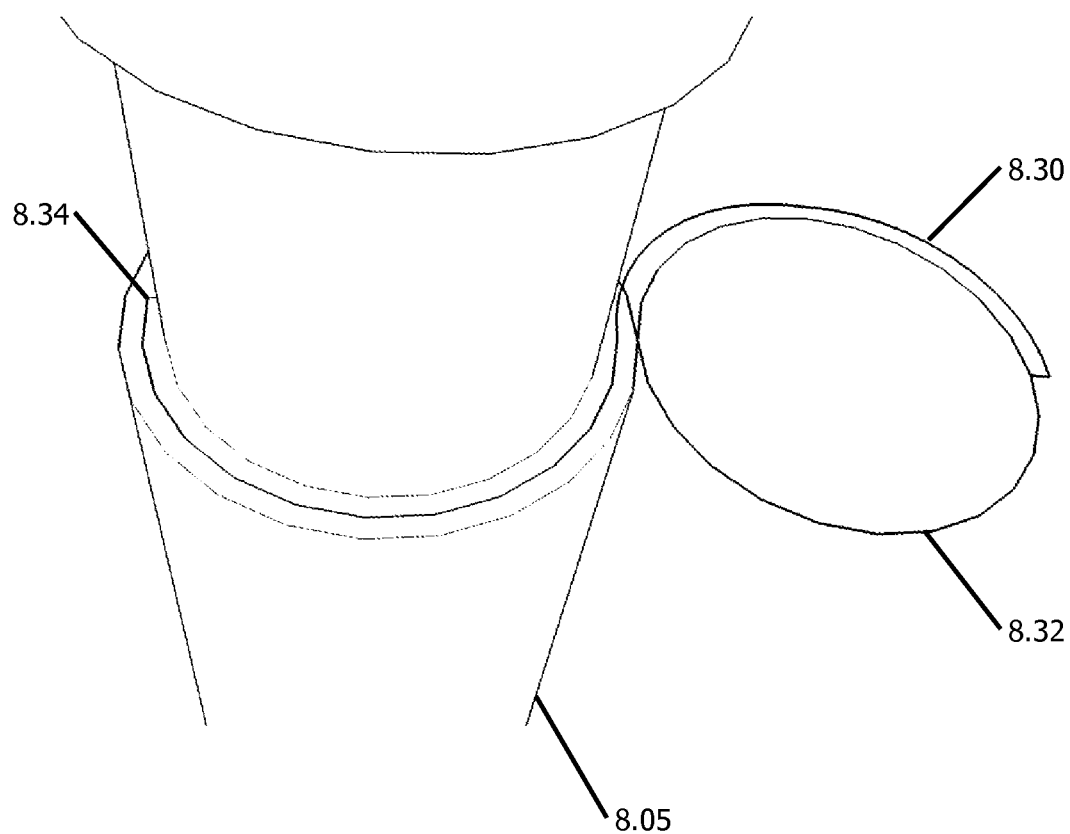
FIG. 8 depicts an orthogonal view of a detail of a version of the disclosure relating to a wing.

FIGS. 8 and 9 and 11 and 12 present examples in this regard, which should be understood to be non-exclusive and/or non-exhaustive examples. FIG. 8 depicts a view of a wing (forward or rear) 8.05, as may be seen within the main thrust member (not shown) and/or wing connector, which view depicts a cable (or similar) 8.30 attached to a roller (or similar) 8.32 at one end and attached to wing 8.05 at the other 8.34. For the sake of clarity, the cable is shown as not touching the roller or wing and a similar cable on the other side of the wing/roller is not shown. The cable may be continuous. The cable need not be wrapped in the figure-8 pattern shown in FIG. 8. The roller 8.32 may be omitted. The roller 8.32 may not be in contact with the wing 8.05. The wing is also depicted as being a continuous circle, as may be the case for a portion of a wing within an enclosure, such as within the main thrust member and/or wing connector; however, the wing need not be a continuous circle and/or may comprise a circular portion connected to a wing-shaped portion. The rotational orientation of the roller 8.32 may be changed, rotating the wing and changing its angle of attack; concomitantly, rotating the wing or changing the angle of attack of the wing may produce a change in the rotational orientation of the roller. If the roller 8.32 is not present, then the cable 8.30 (or cables) may change in length in a similar fashion to change or in response to a change in the angle of attack of the wing. The roller 8.32 and/or the cable 8.30 may be attached to a device, such as a hand actuator, to actively rotate the roller (or to actively change the length of the cable 8.30 if the roller 8.32 is not present) and/or may be attached to a device, such as a hand actuator, which changes the roller's allowed rotation (or which otherwise changes the allowed travel of the cable 8.30, if the roller 8.32 is not present). For example, the arcs, such as 3.07 and 3.08, may be attached to or be part of devices which, when the arcs are loaded (transmitting force), limit the movement of the roller 8.32 and/or wing relative to when the arcs are not loaded. Such a device may include a delay, to synchronize the change in the allowed rotation of the roller with the local movement of the wing in the water, which may not be synchronous with the motion of the force transmitting member.

Figure 9:
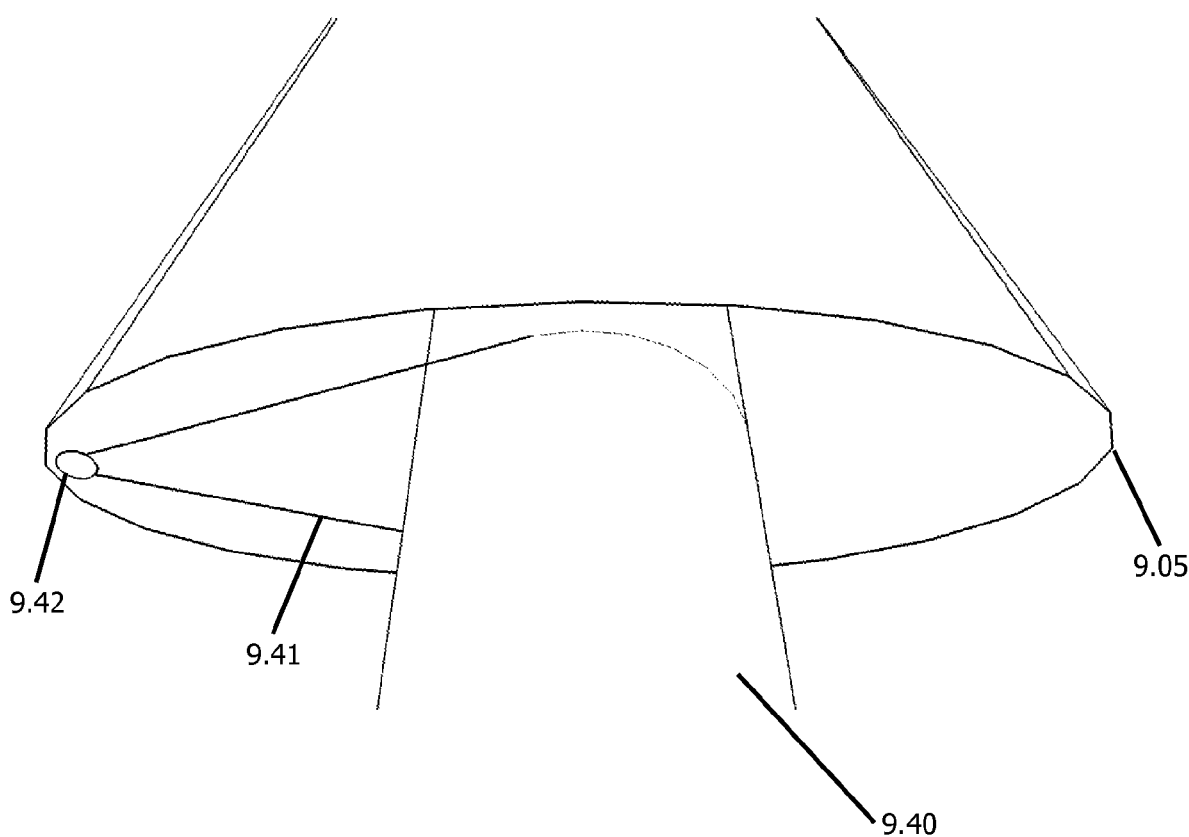
FIG. 9 depicts an orthogonal view of a detail of a version of the disclosure relating to a wing.

FIG. 9 depicts an internal view of a wing 9.05, which in this depiction is oval, though may be another shape, and an internal portion 9.40, which may be round, though may be another shape. Depicted is a cable (or similar) 9.41 connected to both the internal portion 9.40 and an attachment point 9.42. The attachment point 9.42 may be a roller around which the cable may rotate or the attachment point 9.42 may be fixed. The attachment point 9.42 may be attached to and/or in the vicinity of the inside of the wing. There may be a similar cable and attachment point on the other side, not shown for the sake of visual clarity. The length of one or both sides of the cable may be changed, drawing the leading edge of the wing 9.05 toward or away from the internal portion 9.40. Changing the relative positions of the leading edge of the wing 9.05 and the internal portion 9.40 may change the allowed angle of attack of the wing or the thrust produced by the wing, for example, when subject to vertical translation. The length of cable may be changed by winding or unwinding the cable, by actuation of a lever to which the cable or another member may be attached (such as a hand actuator), by pushing/pulling on the cable, by rotating the internal portion 9.40, or similar. Instead of the cable 9.41 and attachment point 9.42, a similar arrangement may be provided by, for example, one or more jointed rods, with one end attached to the internal portion 9.40 and the other attached to the outer perimeter of the wing, and a mechanism to bend the rods (thereby changing the distance between the ends of the rods).

In another embodiment, similar to that depicted in FIG. 8 and as addressed briefly above, the attachment point 9.42 in FIG. 9 may rotate, causing the cable 9.41 to rotate around the attachment point 9.42, and causing the wing 9.05 to rotate around the internal portion 9.40.

The wing may include an elastic connection to the main thrust member. The elastic connection may be part of the modulus of flexibility of the wing. The elastic connection may comprise the wing, the wing being constructed from an elastic material. The elasticity may allow or cause the wing to twist, changing the angle of attack of the wing, as the main thrust member and wing are subject to vertical translation within the water. The shape of the wing may be changed, such as by changing the size of the trailing-edge portion of the wing, which, in combination with the elasticity of the wing, may, for example, cause the wing to twist further. Changing the size of the trailing-edge portion of the wing may be accomplished, for example, by bending the wing backward (toward the rear of the craft) or through use of a flap, as discussed further below.

Figure 11:
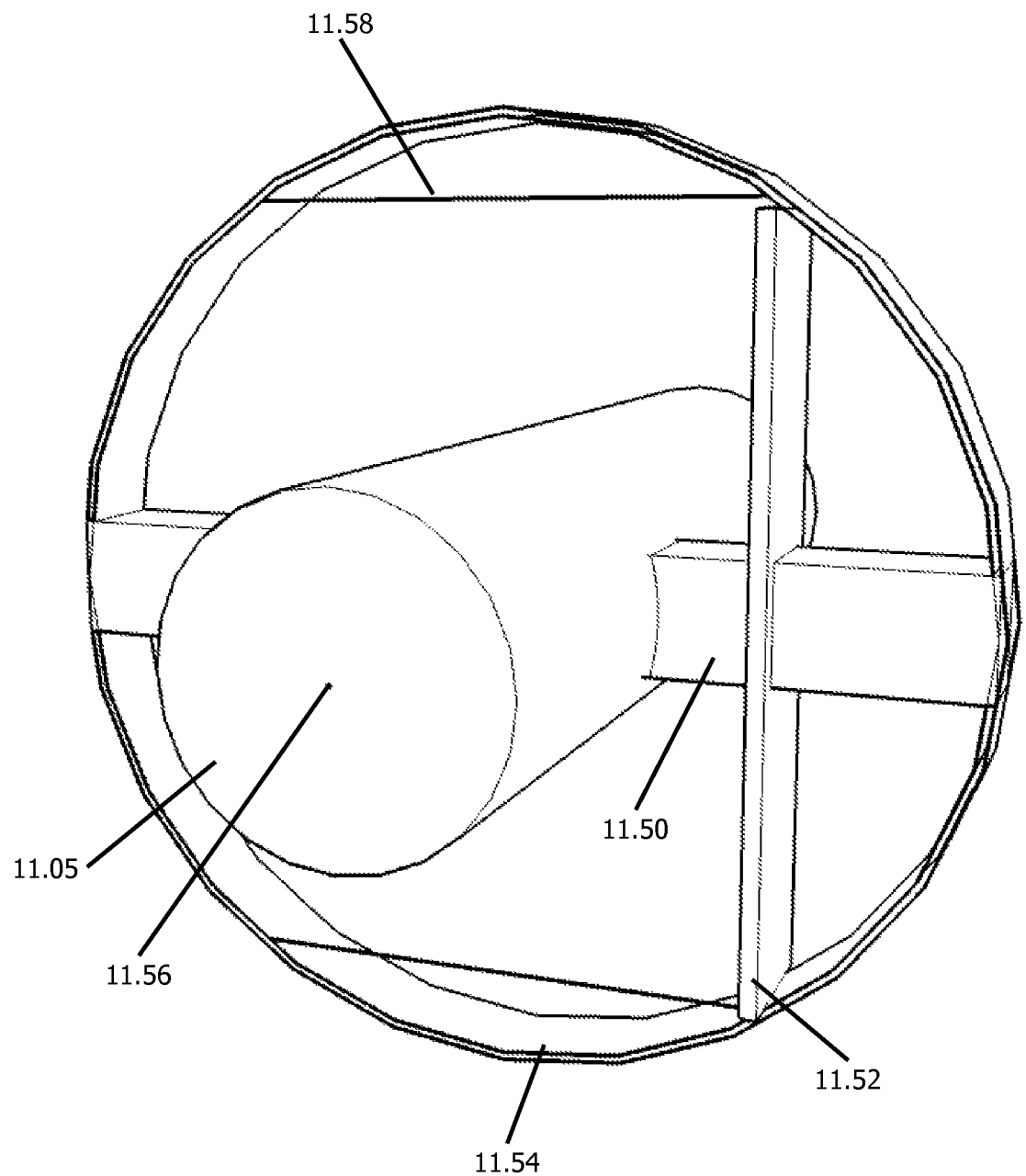
FIG. 11 depicts an orthogonal view of a detail of a version of the disclosure relating to a wing.

In the embodiment illustrated in FIG. 11, an internal portion of the wing 11.05 is shown, said portion generally being internal to a main thrust member and/or wing connector or internal to a section of the wing (not shown). The internal portion of the wing 11.05 includes an elastic portion 11.50 which, at one or both ends, may be attached to the main thrust member, wing connector, or other wing section. The modulus of flexibility of the elastic portion 11.50 may allow the wing to twist (rotate around the center of rotation 11.56) and for the angle of attack of the wing to change as the wing is subject to vertical translation. At least one bracket, such as bracket

11.52, may be disposed along the elastic portion 11.50. The position of the bracket 11.52 may be varied along the elastic portion 11.50, thereby changing the allowable flex of the elastic portion 11.50. The position of the bracket 11.52 may be varied by sliding the bracket 11.52 along a track or rail 11.58. If two such brackets are used, they may be deployed such that the brackets are moved toward each other (toward the center of the internal portion of the wing 11.05, if only one such bracket is used) to decrease the allowed flex of the elastic portion, away from each other (away from the center of the internal portion of the wing 11.05) to increase the allowed flex of the elastic portion. The elastic connection may be provided by an elastic section of the internal portion of the wing 11.05.

Also depicted in FIG. 11 is an optional ring 11.54. The ring may be used, much as described above in relation to FIGS. 8 and 9, to actively adjust the orientation or angle of attack of the wing (the ring acting as the internal portion of the wing, 8.05 and 9.40) and/or to allow the wing 11.05 to rotate around the center of rotation 11.56 (as may be desired, for example, to cause the wing to produce no or reduced thrust as the wing is subject to vertical translation) or to otherwise change the angle of attack of the wing. In addition to the discussion, above, in relation to FIGS. 8 and 9, the ring 11.54 may comprise a releasable one- or two-way freewheel (not shown) which may be engaged (or disengaged) to allow or cause the ring 11.54 and wing to rotate around the center of rotation 11.56.

Figure 12:
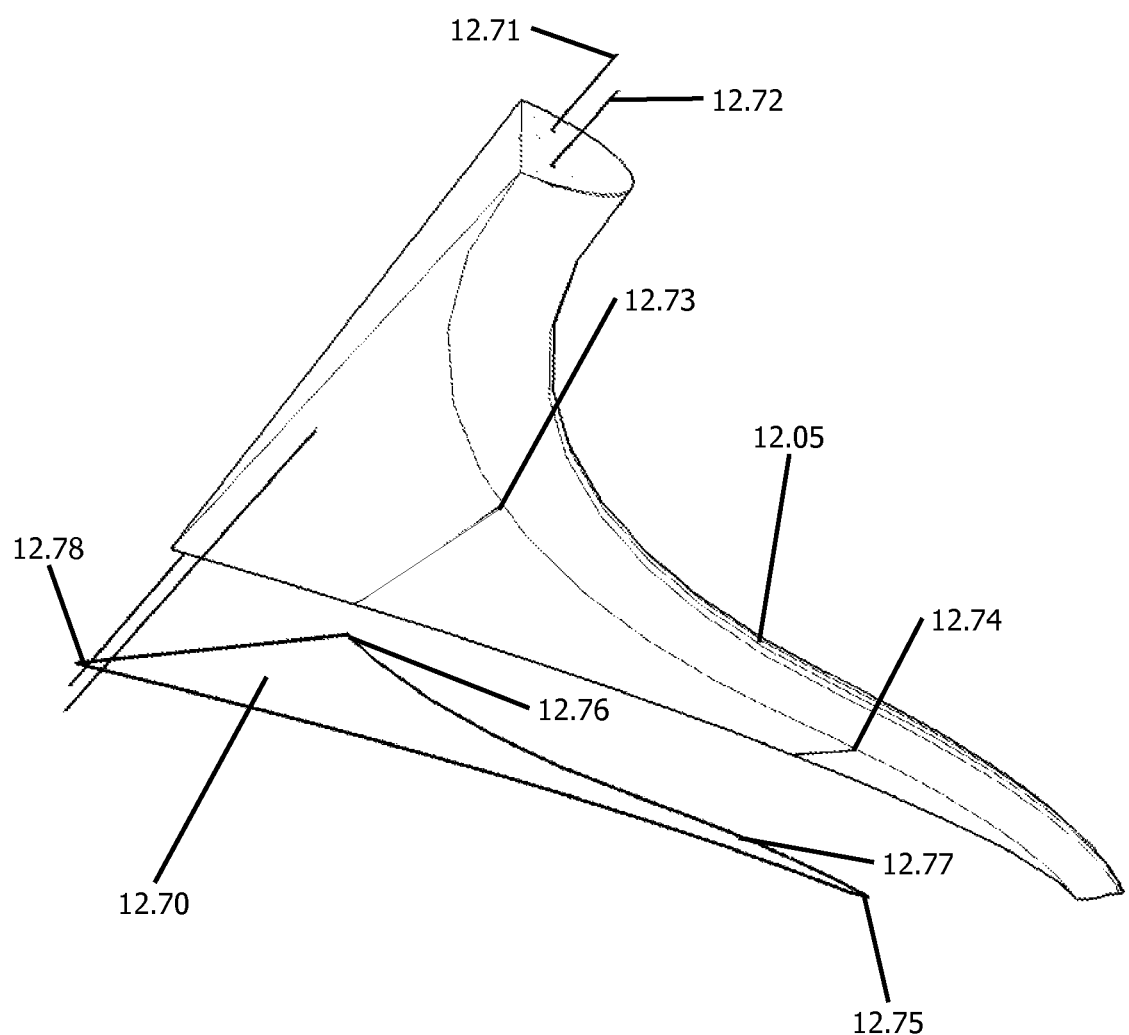
FIG. 12 depicts an orthogonal view of a detail of a version of the disclosure relating to a wing.

FIG. 12 depicts a wing 12.05, including a flap 12.70; for the sake of clarity, the flap 12.70 is shown separated from the wing surface. The flap may be retracted or deployed (moved toward the rear of the craft, extending the flap beyond the normal rear edge of the wing) to change the amount of thrust produced by the wing 12.05. The flap may be located on one side of the wing 12.05, such as the bottom side, or on both sides of the wing (not shown). The flap may be positioned midway through or otherwise within a wing. Locating one flap on the bottom side of the wing 12.05 may be desirable if, for example, more thrust is produced (or desired to be produced) on the downward cycle during vertical translation of the motor. A flap may produce a change in thrust whether located on the top or bottom of a wing. The shape of the flap may be different than that shown in FIG. 12. The flap may be provided by a mechanism such as are used on aircraft or watercraft.

The flap 12.70 may include one or more flanges, grommets, or other projections in the vicinity of a location such as 12.76 and/or 12.77, which projections extend into a track, such as may be located at or near 12.73 and/or 12.74. The projections within the track may attach to a push rod, screw, or similar within the wing 12.05. The push rod, screw, or similar may be attached to one or more flap actuator rods, such as 12.71 and/or 12.72. Two flap actuator rods 12.71 and 12.72 are depicted in FIG. 12, though one or more than two may be used. The flap actuator rods 12.71 and 12.72 may rotate or be translated forward and back, such as upon loading of the force transmitting member and/or rotation of a hand lever, such as may be located at 4.16. Alternatively, the flap actuator rods 12.71 and 12.72 may be rigid, while the main force member flexes, thereby producing differential motion between the flap actuator rods 12.71 and 12.72 and the main force member and/or wing. Loading of the force transmitting member may cause deformation of the arc; deformation of the arc may be used by a variety of mechanisms to cause the flap actuator rods 12.71 and 12.72 to rotate and/or to translate forward and back. The flap actuator rods 12.71 and 12.72 may be connected to the push rod, screw, or similar, and when moved (or undergoing differential motion relative to the main force member and/or wing) may push the rod, screw the screw, or similar to cause the flap to be retracted or deployed.

Alternatively, the flap 12.70 may be rotatably attached to the wing 12.05, such as by a grommet or similar at 12.75. Another point on the flap, such as at a projection in the area of 12.76 or 12.78, may be connected (as discussed above) to the flap actuator rods 12.71 and 12.72, thereby causing the flap to pivot around the grommet or similar at 12.75 with the rotation and/or translation of the flap actuator rods 12.71 and 12.72. If the wing 12.05 is a forward wing, one or more of the flap actuator rods 12.71 and 12.72 may continue to the rear wing. One flap actuator rod may control a single flap on a single wing or a flap actuator rod may control more than one flap, potentially on more than one wing.

In an alternative embodiment, the flap 12.70 may connect to a flap actuator rod 12.71 and 12.72 and/or to a another mechanism, not shown, which causes the flap to retract or deploy in response to vertical translation of the wing 12.05. A number of mechanisms may convert vertical translation of the distal end of the wing relative to the main thrust member (the wing tip) into movement of the flap. For example, the attachment of the wing and the main thrust member may include gear or similar (a full 360 degrees of rotation not being required in many implementations), which gear converts the difference in motion between the wing and the main thrust member into force on a rod (such as rotation of or a push/pull on the rod) belt, or similar, which force may be used to deploy or retract the flap 12.70.

A set of wings, forward or back and/or on either side of the craft, may share a common mechanism as discussed above in FIGS. 8, 9, 11, and/or 12 and may rotate or have an angle of attack or flap which is adjusted together or the set of wings may have independent mechanisms allowing a wing on one side of the craft to be rotated or adjusted separately from the other side. Independent mechanisms may be useful, for example, to change the amount of thrust produced by one side (left, right, forward, back) of the craft relative to the other side, which may be useful as or as part of a steering mechanism.

Energy input required to turn the craft (or changing a setting which leads to turning the craft) may be obtained from the user's hands' manipulation of the steering handle 4.16 and/or one or more levers connected to the steering handle 4.16 and/or from differential actuation of the engine (including, as noted previously, the user's weight) on the platform or platforms, such as 4.09 and 4.10. For example, the engine and/or platform or platforms 4.09 and 4.10 may be attached to a mechanism, such as or similar to a differential, which mechanism would also be attached to the front and/or rear wing, and which mechanism would provide that asymmetric oscillation of the engine, relative to the central axis of the craft, would result in feathering of a wing or wings, change in the allowed angle of attack of a wing or wings, alteration of the horizontal orientation of one or more of the wings, deployment or retraction of a flap, actuation of a tiller, and/or other steering force.

Figure five depicts the craft with an arched main thrust member 5.06. The attachment between the arched main thrust member 5.06 and the wing connector 5.18 may be moved forward (or back), relative to what is depicted in the figure, so as to relocate the attachment between the front wings or to another location. Similarly, the attachment between the arched main thrust member 5.06 and the rear wing 5.03 may be moved toward the stern (or forward). In this example, the displacement of the front and/or rear wings may have to be increased to account for the absence of displacement from the arched main thrust member 5.06.

Figure six depicts the craft with more than one main thrust member 6.22 and 6.23 as well as more than one rear wing 6.20 and 6.21. The rear wings may be attached by a member (not shown), which may be straight, shaped like wing connector 4.18, or which may include a connector which spends at least a portion of time above the water, such as arc connectors 4.11, 4.12, or 4.13, or another shape.

Figure 3:
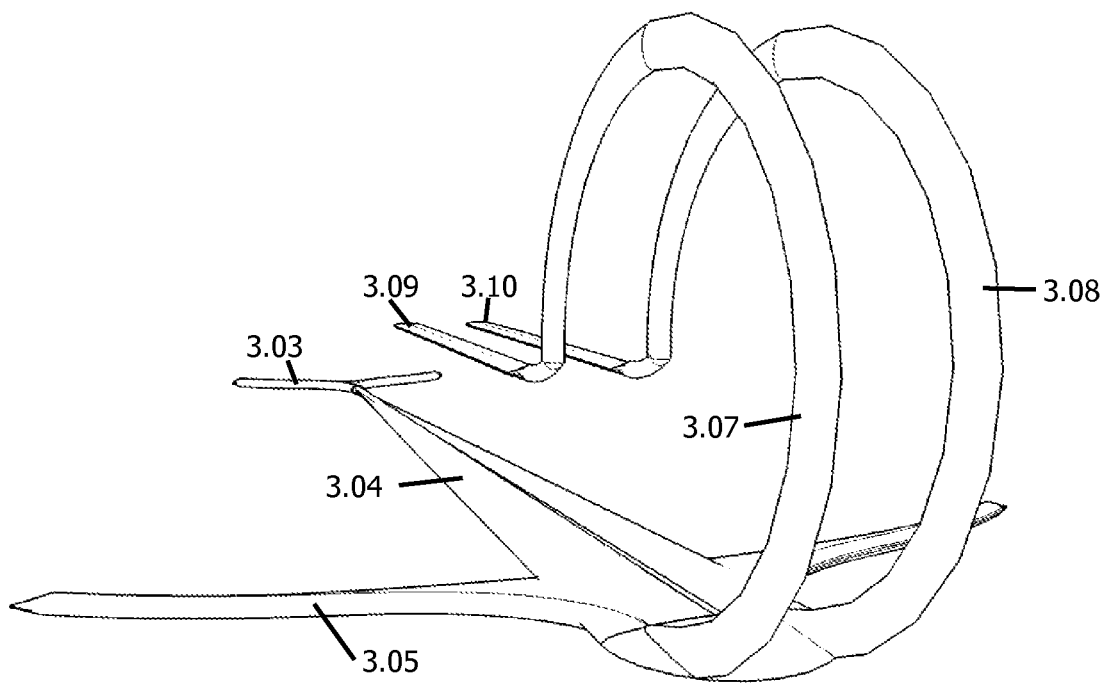
FIG. 3 depicts an orthogonal view of a version of the disclosure with two force transmitting members

Figure seven depicts elevation views in FIGS. 7.A and 7.C and a plan view in FIG. 7.B. For the sake of economy, these views are prepared relative to the craft depicted in FIG. 3. The frontal area and displacement of the craft is depicted in FIG. 7 as being fairly uniform, though it should be understood that the frontal area and displacement may not be as uniform as depicted.

Figure 5:
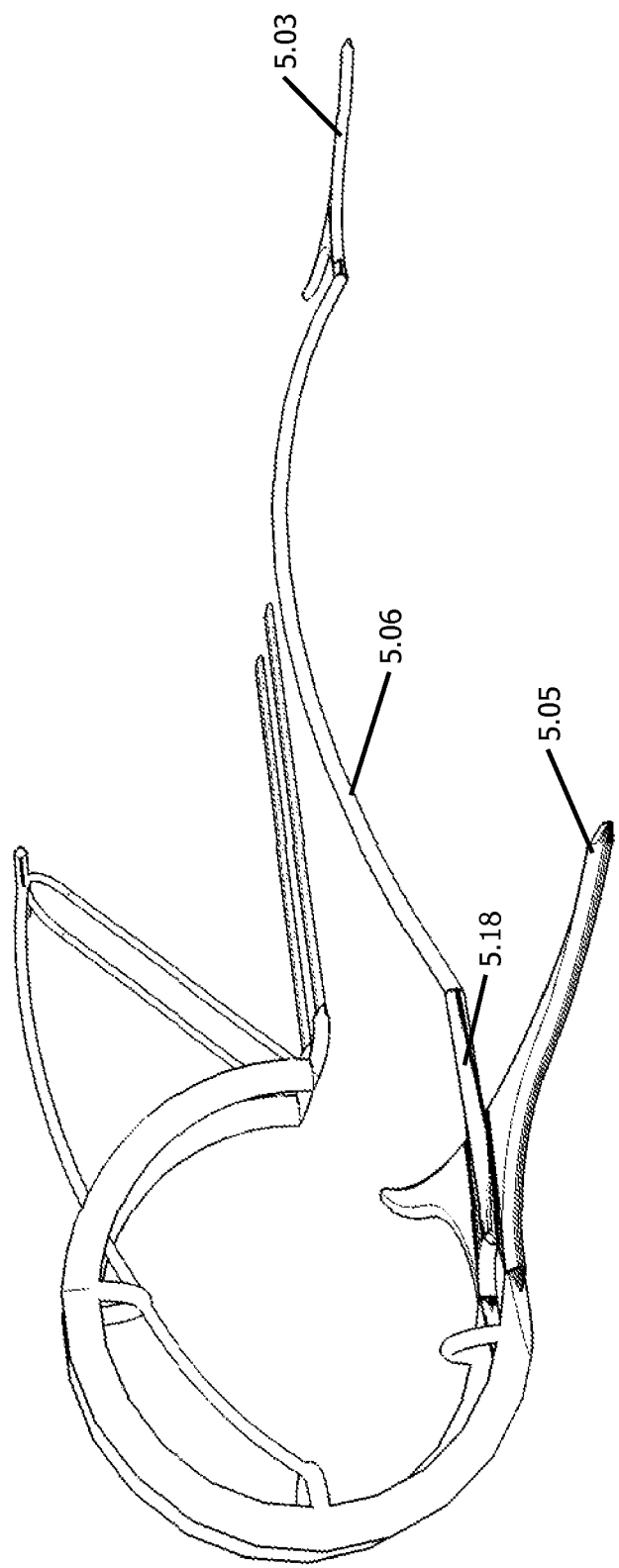
FIG. 5 depicts an orthogonal view of a version of the disclosure with an arched main thrust member.
Figure 6:
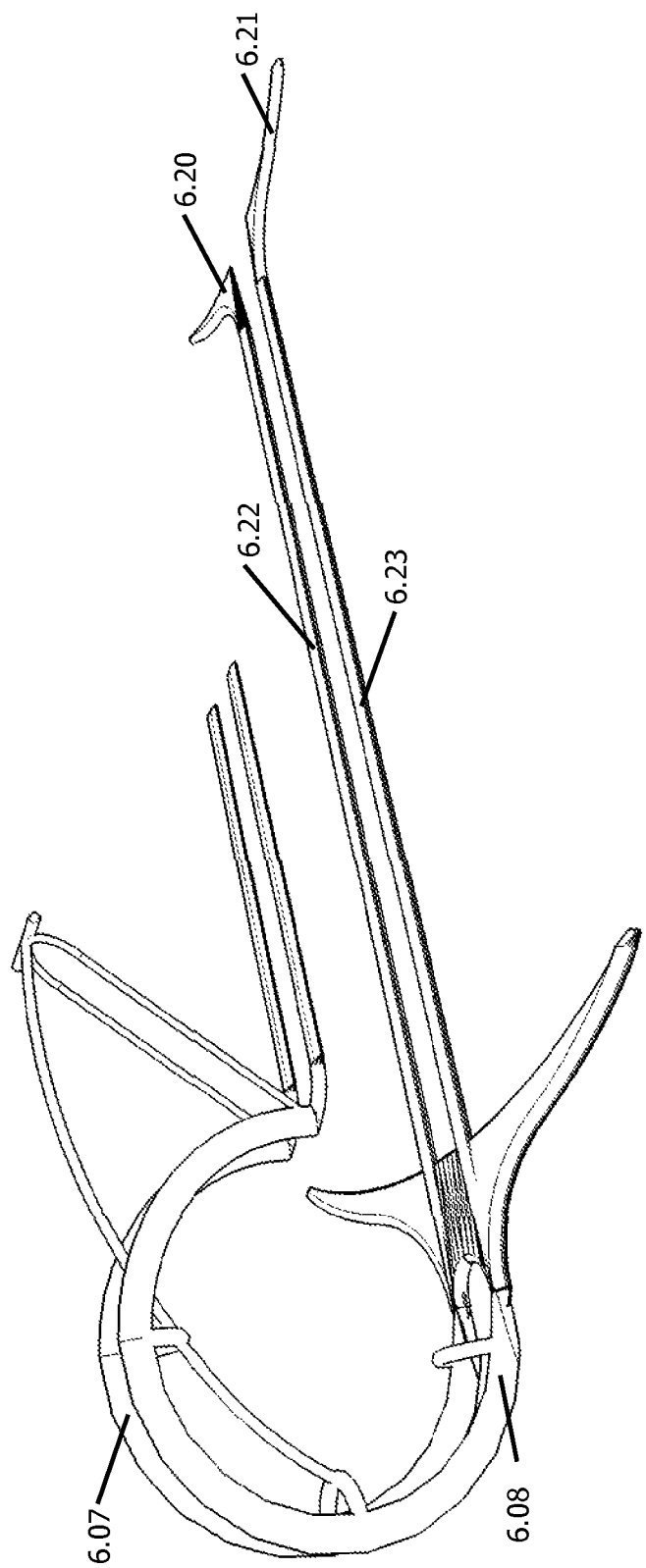
FIG. 6 depicts an orthogonal view of a version of the disclosure with two main thrust members.

FIG. 10 depicts multiple orthogonal views of a version of the disclosure. In this version, more than one main thrust member 10.22 and 10.23 are depicted. The thrust members 10.22 and 10.23 are spaced more widely than the platforms 10.09 and 10.10, though the spacing may be equalized or the components may be configured such that the thrust members 10.22 and 10.23 are spaced more closely than the platforms 10.09 and 10.10. The thrust members 10.22 and 10.23 are depicted with a vertically oriented oval cross-section and tapering front-to-back (it being understood that the cross-sections may have another shape). The wings 10.03 and 10.05 may be connected by one or more curved main thrust members, as discussed above in relation to FIG. 5, which one or more curved main thrust members may be connected, for example, to the front, middle, or back of the wings. The wings 10.03 and 10.05 may include one or more portions provided for the purpose of displacement.

The wings 10.03 and 10.05 are depicted with straight and parallel leading and trailing edges, though the leading and trailing edges need not be straight and/or parallel. The wings 10.03 and 10.05 are not depicted as projecting beyond the main thrust members 10.22 and 10.23, though they may include portions (not shown) which project beyond the main thrust members 10.22 and 10.23.

Two platforms 10.09 and 10.10 are depicted, though one platform may be utilized, much as described above.

One or more steering mechanisms as described above may be incorporated into the water craft depicted in FIG. 10. The wings 10.03 and 10.05 may be divided into sections, each of which may include a separately activated flap, as discussed above in relation to FIG. 12.

FIG. 13.A depicts an orthogonal view of a version of the disclosure with a narrower main force member 13.04 and arc 13.01 with vertically oriented oval cross-sections (the long direction of the oval is vertically oriented) and floats 13.80 and 13.82. As discussed above, the cross-section, frontal area, and displacement of one or more of the main force member 13.04 and/or arc 13.01 and/or wings 13.05 and 13.03 and/or floats 13.80 and 13.82 may be other than as depicted in FIGS. 13.A and 13.B. FIGS. 13.A and 13.B are presented to teach that displacement of the main force member, force transmitting member, and wings may be reduced, with the displacement being made up for by the floats and/or with the floats providing initial stability. As discussed above, the displacement of the floats may be changed, for example, to accommodate different payloads or for other reasons. As with other components, the shape of the floats may be different than as shown in the figure. The floats may be located on another structure, such as a set of arms projecting off of the platform 13.02, the main force member 13.04, or off of arms 13.84 projecting off of the arc 13.01, as is depicted in FIG. 13.B. The arms 13.84 may include a mechanism to change the height of the arms relative to the waterline.

FIG. 14 depicts an orthogonal view of a version of the disclosure with a narrower main force member 14.04 and arc 14.01 with vertically oriented oval cross-sections (the long direction of the oval is vertically oriented in the main force member), floats 14.80 and 14.82 at the ends of arms 14.84, and with the forward wing 14.05 located further aft on the craft, such as at or near the centroid of the main force member. The bottom of the floats 14.80 and 14.82 is located approximately at the level of the top of the main force member. As noted above, the arms 14.84 may include a mechanism to change the height of the arms relative to the water. For example, if the floats 14.80 and 14.82 provide initial stability for the craft (when it is not moving), and if the wings provide secondary stability when the craft is under way, then a mechanism to change the height of the floats may be used to draw the floats upward, so that they are no longer touching the water. In the depiction in FIG. 14, the forward wing 14.05 is smaller than the rear wing 14.03, though the perspective (orthogonal) view does not show this well.

Another way to describe the main force member is that it comprises at least one continuous generally horizontal (horizontal at least in terms of an average angle across the member) member connected to at least one wing, which generally horizontal member and/or wing and/or a float displace sufficient water to support the watercraft and payload; the main force member is connected to at least one force transmitting member, which force transmitting member comprises an engine mount and may comprise, between the engine mount and the main force member, at least one generally semi-circular portion and/or at least one portion between the engine mount and the main force member which portion connects to the front end of the main force member before, or generally in the vicinity, of where the forward-most wing connects to the main force member.

The components of the craft may be made from a wide variety of materials, including, for example and without limitation, wood (including plywood), iron, steel, aluminum, plastic, composites, including carbon-fiber, fiber-glass, kevlar, and aramid and para-aramid composites, wood, air, and foam cored composites.

Generally stated, the disclosed invention is directed to a watercraft which comprises at least one main force member attached to at least one wing; the main force member and/or wing and/or a float comprise sufficient displacement to provide flotation for the craft and its payload. Connected to the main force member is a force transmitting member, to which the engine is connected. The engine may comprise a person or another engine (conventional, electronic, wind, etc.). The engine may comprise a weight which undergoes vertical translation, thereby producing the force transmitted by the force transmitting member to the main force member.

The invention claimed is:

1. A watercraft comprising: at least one force transmitting member, connected to at least one main force member; which at least one main force member is attached to at least one wing; which at least one force transmitting member is adapted to be attached to an engine; wherein the at least one force transmitting member connects to the at least one main force member forward of where a most forward of the at least one wing attaches to the at least one main force member; further comprising more than one main force member.

2. The watercraft according to claim 1 where the engine produces force by subjecting a weight to at least vertical translation.

3. The watercraft according to claim 1 where the engine produces force by subjecting a weight to at least horizontal translation.

4. The watercraft according to claim 1 wherein thrust is produced asymmetrically on the two sides of the watercraft.

5. The watercraft according to claim 1 comprising more than one force transmitting member.

6. The watercraft according to claim 1 wherein the force transmitting member comprises at least one platform.

7. The watercraft according to claim 1 wherein the at least one main force member and/or the at least one wing and/or a float displace sufficient fluid to support the weight of the watercraft and payload.

8. The watercraft according to claim 1 further comprising a mechanism to change the displacement of at least one of the at least one wing and/or the main force member and/or a float connected to the wing, the main force member, and/or the force transmitting member.

9. The watercraft according to claim 1 further comprising at least one float.

10. The watercraft according to claim 9, wherein the float is disposed to provide initial stability for the watercraft.

11. A watercraft comprising: at least one force transmitting member, connected to at least one main force member; which at least one main force member is attached to at least one wing; which at least one force transmitting member is adapted to be attached to an engine; wherein the at least one force transmitting member connects to the at least one main force member forward of where a most forward of the at least one wing attaches to the at least one main force member; wherein a float is attached to the watercraft by an arm and including a mechanism to change the height of the float relative to the water.

12. The watercraft according to claim 11 further comprising a steering mechanism.

13. The watercraft according to claim 12 wherein the steering mechanism comprises at least one hand actuator.

14. The watercraft according to claim 12 wherein the steering mechanism comprises a mechanism to change the orientation of at least a portion of the at least one wing relative to at least the main thrust member.

15. The watercraft according to claim 11 further comprising a mechanism to change the angle of attack of the at least one wing.

16. The watercraft according to claim 15 wherein the mechanism to change the angle of attack comprises a mechanism to change the allowed range of motion of the forward and/or rear side of the wing relative to the normal horizontal center-line of the wing.

17. The watercraft according to claim 16 wherein the mechanism to change the angle of attack comprises a mechanism which changes the allowed range of motion depending on the force transmitted by the at least one force transmitting member.

18. The watercraft according to claim 11 wherein the at least one wing further comprises at least one repositionable flap.

19. The watercraft according to claim 18 wherein the at least one flap may be repositioned at least in part by a hand actuator.

20. The watercraft according to claim 18 wherein the at least one flap may be repositioned at least in part in response to or by a load being placed on the at least one force transmitting member.

21. The watercraft according to claim 18 wherein the at least one flap may be repositioned at least in part in response to or by vertical translation of the at least one wing relative at least to the main thrust member.

22. The watercraft according to claim 1 where the engine comprises at least one of a human, an internal combustion engine, an electric motor, or a wind turbine.

* * * * *